United States Patent
Riesterer et al.

(10) Patent No.: US 9,986,689 B2
(45) Date of Patent: Jun. 5, 2018

(54) UTILIZING CROP MOISTURE DATA

(71) Applicant: Deere & Company, Moline, IL (US)

(72) Inventors: James William Riesterer, Pleasant Hill, IA (US); Mark A. Cracraft, Johnston, IA (US); Jeffrey S. Wigdahl, Ames, IA (US); Jerry B. Hall, Johnston, IA (US); Terence D. Pickett, Waukee, IA (US); Daniel R. Smith, Ankeny, IA (US)

(73) Assignee: Deere & Company, Moline, IL (US)

( * ) Notice: Subject to any disclaimer, the term of this patent is extended or adjusted under 35 U.S.C. 154(b) by 793 days.

(21) Appl. No.: 14/492,982

(22) Filed: Sep. 22, 2014

(65) Prior Publication Data
US 2016/0081276 A1 Mar. 24, 2016

(51) Int. Cl.
| A01D 89/00 | (2006.01) |
| A01F 15/08 | (2006.01) |
| G05B 15/02 | (2006.01) |
| D06M 15/00 | (2006.01) |

(52) U.S. Cl.
CPC ............ *A01F 15/08* (2013.01); *D06M 15/00* (2013.01); *G05B 15/02* (2013.01)

(58) Field of Classification Search
CPC ......... A01F 15/08; D06M 15/00; G05B 15/02
USPC ......................................................... 700/275
See application file for complete search history.

(56) References Cited

U.S. PATENT DOCUMENTS

| 6,112,131 A * | 8/2000 | Ghorashi | G01N 33/362 700/142 |
| 7,756,719 B2 | 7/2010 | Beck et al. | |
| 8,407,157 B2 | 3/2013 | Anderson | |
| 8,452,496 B2 | 5/2013 | Foster et al. | |
| 8,531,300 B2 | 9/2013 | Foster et al. | |
| 2002/0029151 A1 * | 3/2002 | Shofner | D01G 31/006 705/1.1 |
| 2004/0193466 A1 * | 9/2004 | Kull | G06Q 10/087 705/28 |
| 2005/0197175 A1 * | 9/2005 | Anderson | A01B 69/008 460/1 |
| 2012/0072533 A1 * | 3/2012 | O'Neil | G06F 9/5055 709/217 |
| 2012/0103205 A1 * | 5/2012 | Kraus | A01F 15/08 100/2 |
| 2013/0006481 A1 * | 1/2013 | Foster | G06Q 10/0833 701/50 |

\* cited by examiner

*Primary Examiner* — Yuhui R Pan
(74) *Attorney, Agent, or Firm* — Joseph R. Kelly

(57) ABSTRACT

As a module is formed, characteristics of the module are sensed by the module forming machine. A module record is generated that includes a module identifier, a module location, and one or more sensed characteristics. The module record is output for use by other machines or systems.

14 Claims, 14 Drawing Sheets

| MODULE RECORD |
|---|
| MODULE IDENTIFIER — 272 |
| LOCATION — 264 |
| OPERATOR/MACHINE INFORMATION — 266 |
| SENSED AND OTHER CHARACTERISTICS — 274 |
| MOISTURE CONTENT — 268 |
| CROP VARIETY — 276 |
| OWNERSHIP INFORMATION — 278 |
| WEATHER DATA — 280 |
| QUALITY DATA — 282 |
| YIELD DATA — 284 |
| OVERALL SIZE — 286 |
| WEIGHT — 288 |
| INFERRED OR DERIVED CHARACTERISTICS — 290 |
| OTHER CHARACTERISTICS — 292 |
| OTHER MODULE RECORD INFORMATION — 294, 296 |

FIG. 3A

UTILIZING CROP MOISTURE DATA

FIELD OF THE DESCRIPTION

The present description relates to baled agricultural material. More specifically, the present description relates to sensing moisture of the baled material and using the sensed moisture downstream of the harvesting operation.

BACKGROUND

There are a wide variety of different types of baled agricultural material. For instance, such material can include cotton, hay, and plant biomass material, among a wide variety of others. Some examples of baled plant biomass material include corn stalks, sugarcane residue, switchgrass, etc.

For the purposes of the present discussion, in an example embodiment, a bale of any of these types of baled agricultural material (or others) is referred to herein as a module. Modules can be formed by a wide variety of different types of module forming machines. For instance, a cotton harvester forms cotton modules, as it harvests the cotton. Various kinds of balers form hay modules and corn stalk modules. These are only examples of a wide variety of different types of module forming machines.

Once a set of modules is formed in a field, the modules are often staged either within the field or at a nearby location, for pickup and transport to a remote facility. For instance, the modules can be staged for pickup and transport to a storage facility, a processing facility, or another type of facility.

As one example, cotton modules are often staged within a cotton field so that they can be picked up and transported to either a storage facility or to a cotton gin. If the modules are transported to a storage facility, they may also undergo some type of processing. For instance, some cotton modules may be dried before they are stored.

The discussion above is merely provided for general background information and is not intended to be used as an aid in determining the scope of the claimed subject matter.

SUMMARY

As a module is formed, characteristics of the module are sensed by the module forming machine. A module record is generated that includes a module identifier, a module location, and one or more sensed characteristics. The module record is output for use by other machines or systems.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3A shows one example of a module record.

DETAILED DESCRIPTION

Figure 1:
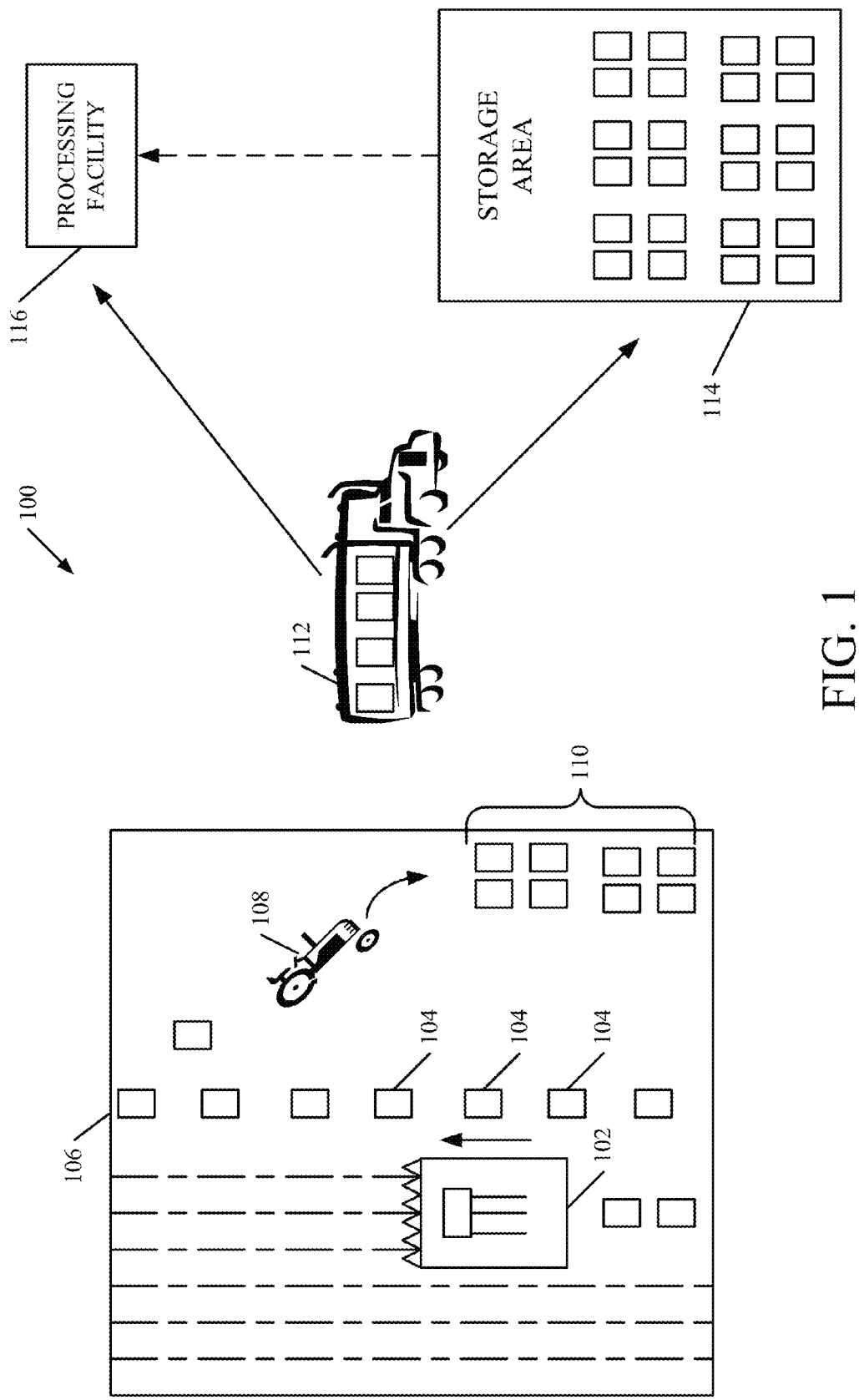
FIG. 1 is a block diagram illustrating one example of a module processing operation.

FIG. 1 is a block diagram of one example of a module processing operation 100. Operation 100 shows a module forming machine 102 that forms a set of modules 104 within a field 106. A module staging machine 108 stages modules 104 by arranging them in staged groups 110 according to one or more characteristics that are sensed by module forming machine 102. The staged groups 110 of modules 104 are illustratively picked up and transported by a transport machine 112. In one example, they can be transported to a storage area (or storage facility) 114 where they can be stored, or further processed (e.g., dried) and then stored. In another example, transport machine 112 transports the modules to processing facility 116 where they are processed.

The operations that happen with respect to modules 104 downstream of module forming machine 102 (e.g., after the modules are formed) can affect the overall performance of module processing operation 100 in terms of profitability. For instance, properly staging modules 104 in an efficient way can directly affect the logistical operations of module processing operation 100. If the logistics are arranged properly, this can increase profitability.

In addition, some modules 104 may be sensitive to certain characteristics, in that they should undergo certain types of processing, or undergo processing according to a certain priority, for best results. As but one example, some of modules 104 may be sensitive to their moisture content. In such an example, module forming machine 102 can include sensors (such as a moisture sensor and other sensors) that can be used to sense characteristics (such as moisture content) of modules 104, as they are being formed. Machine 102 can also generate a module record corresponding to each module 104, as it is formed. The module record can include a variety of different types of information (such as the sensed characteristics) that can be used by other machines or systems in the downstream processing of module 104.

Portions of the present discussion will proceed with respect to module forming machine 102 being a cotton harvesting machine and staging machine 108 being a staging tractor that moves cotton modules 104 into groups 110 for pick up by transport machine 112. Transport machine 112 will be described as a semi-tractor that includes a trailer for transporting grouped modules 104 either to storage area 114 (where they can be further processed, such as dried, etc. and stored) or processing facility 116 where they can be ginned.

However, it will be appreciated that this is only one example of an operation for processing modules. The present discussion is just as applicable to other types of modules (such as corn stalk bales, hay bales, other plant biomass bales, or other baled agricultural material). In those cases, the particular machine 102 that forms the modules may be a different type of baler or harvester, and the staging machine 108, transport machine 112, storage area 114 and processing facility 116 may be different, depending on the particular type of baled agricultural material. However, the present discussion is equally applicable to all of those (and other) types of baled agricultural materials as well.

In the scenario where module forming machine 102 is a cotton harvester and modules 104 are cotton modules, it may be that processing cotton modules 104 within operation 100 is sensitive to certain characteristics (such as moisture) of the module 104. It may also be that the cotton modules 104 have varying moisture content. Some cotton may be harvested when it has a higher moisture content than is desired for storing the module, without fungal or heat damage (due to spontaneous combustion). Therefore, the storage life of such modules 104 may be decreased. Extending the storage time of such modules beyond their optimal storage life (based on their moisture content) can result in crop degradation due to a decrease in color characteristics and other quality parameters. Also, in one example, some of the cotton modules 104 may have an undesirably low moisture content. This can make them prone to damage during the ginning process at processing facility 116.

Therefore, it can be seen that cotton modules that have different moisture content can have different processing requirements that should be performed in order to maintain a high quality fiber at the most efficient processing cost. When modules of mixed moisture level are grouped together, so that they are transported and either stored or processed together, this can result in poor overall performance of operation 100. For instance, this can result in the modules with low moisture content being over dried (which results in unnecessary drying expense and possible fiber damage during the ginning process). It can also result in modules with a relatively high moisture content being insufficiently dried (which can reduce their storage life), and stored too long before they are ginned (resulting in a degradation of quality).

Figure 1A:
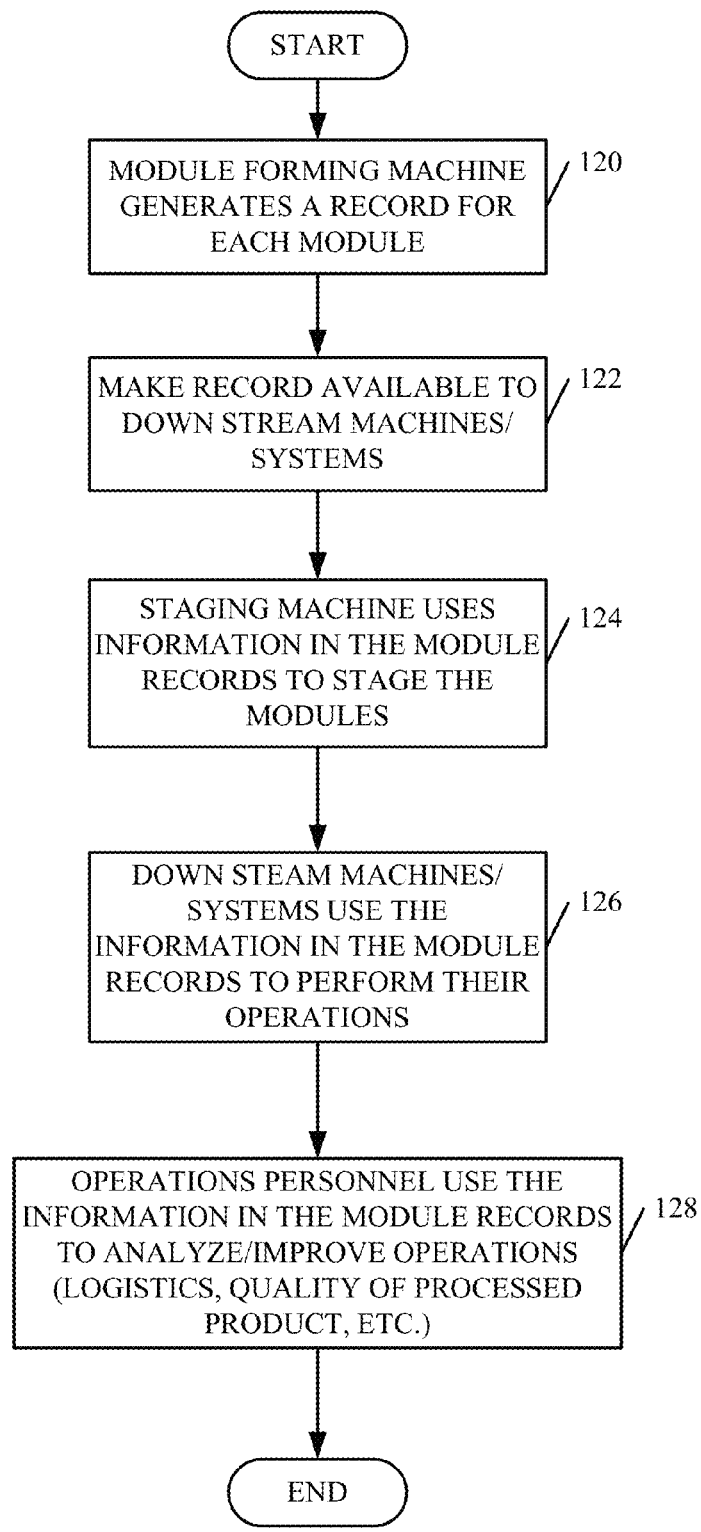
FIG. 1A is a flow diagram illustrating one example of the overall operation of the module processing operations shown in FIG. 1.

FIG. 1A shows a flow diagram illustrating one example of the overall operation of various parts of module processing operation 100. In one example, module forming machine 102 generates a record for each module 104, as that module is formed. This is indicated by block 120 in FIG. 1A. As is described in greater detail below with respect to FIG. 3A, the module record can include a module identifier, the location of the module within field 106, and a variety of sensed characteristics of the module, such as its moisture content, weight, etc. The module record is then made available to other machines or systems downstream of module forming machine 102, in operation 100. This is indicated by block 122.

Staging machine 108 then uses the information in the module records to stage the modules 104 into groups 110. This is described in greater detail below with respect to FIG. 4. Briefly, however, staging machine 108 can include a staging tool that generates a user interface for the operator of machine 108 that allows the operator to identify modules 104 that should be grouped together based upon characteristics of interest. In one example, the staging tool generates a user interface display for the operator of machine 108, that highlights modules 104, in field 106, that should be grouped together. As but one example, the staging tool can highlight modules of similar moisture content so that they can be staged together in groups 110. Staging machine 108 then modifies the module record to indicate the new location of the modules, after they are grouped into groups 110. Using the information in the module record to stage modules 104 is indicated by block 124 in FIG. 1A.

The downstream machines or systems (such as transport machine 112, storage area 114 and processing facility 116) can also use the information in the module records to perform their operations. This is indicated by block 126 in FIG. 1A. For instance, storage area 114 may use the information in the module record to dry modules that have excess moisture content. Processing facility 116 may schedule processing of modules based upon their moisture content, and it may adjust processing parameters based upon information in the module record. For instance, excessively dry modules may have moisture added to them, prior to or during processing, to increase the quality of the processed product.

Operations personnel (such as a farm manager or other personnel) can also use the information in the module records in order to analyze the logistical operations, or other aspects of operation 100, in order to improve the performance of operation 100. This is indicated by block 128 in FIG. 1A.

Figure 2A:
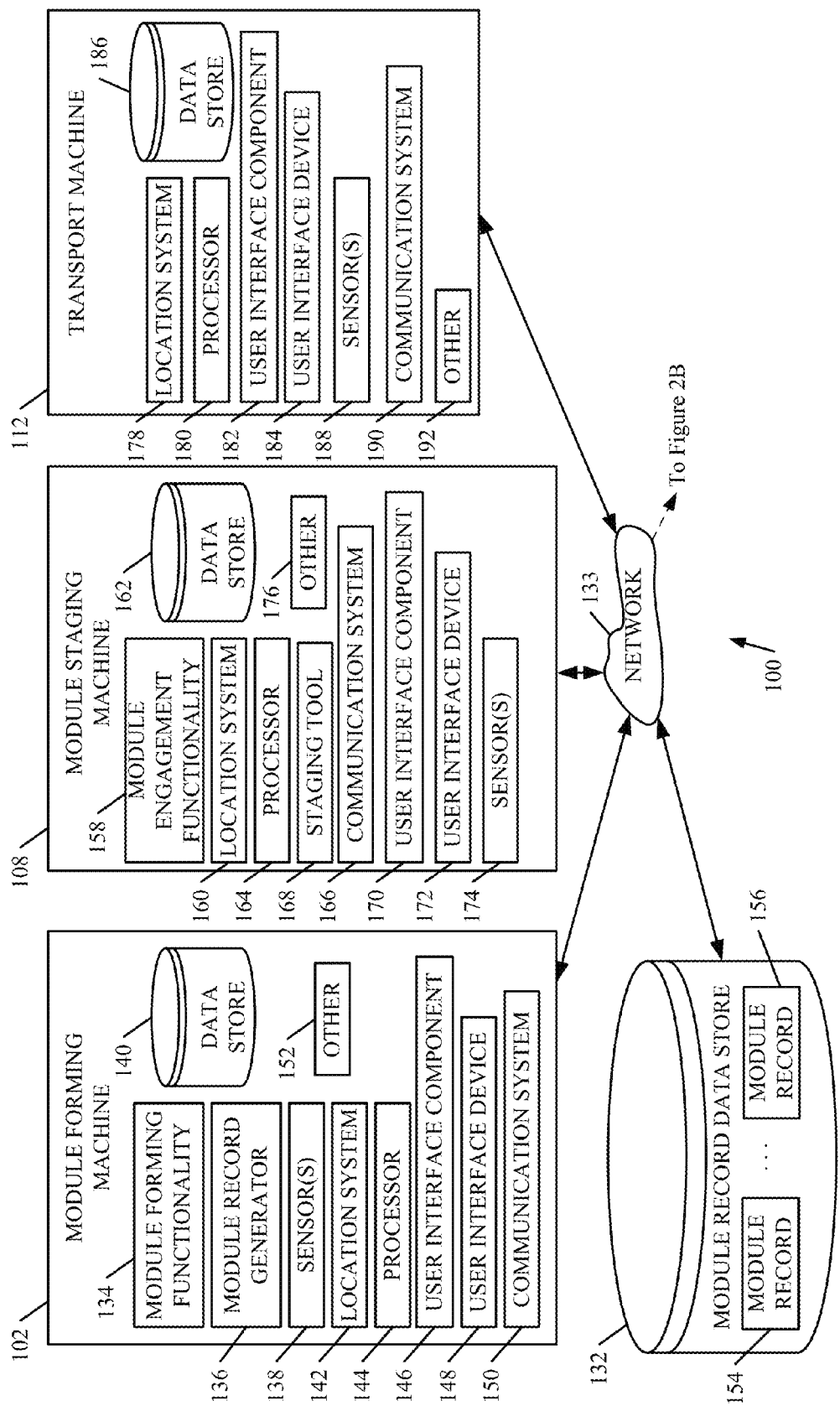
FIGS. 2A and 2B (collectively referred to as FIG. 2) show a block diagram illustrating one example of various items in the module processing operation of FIG. 1, in more detail.
Figure 2B:
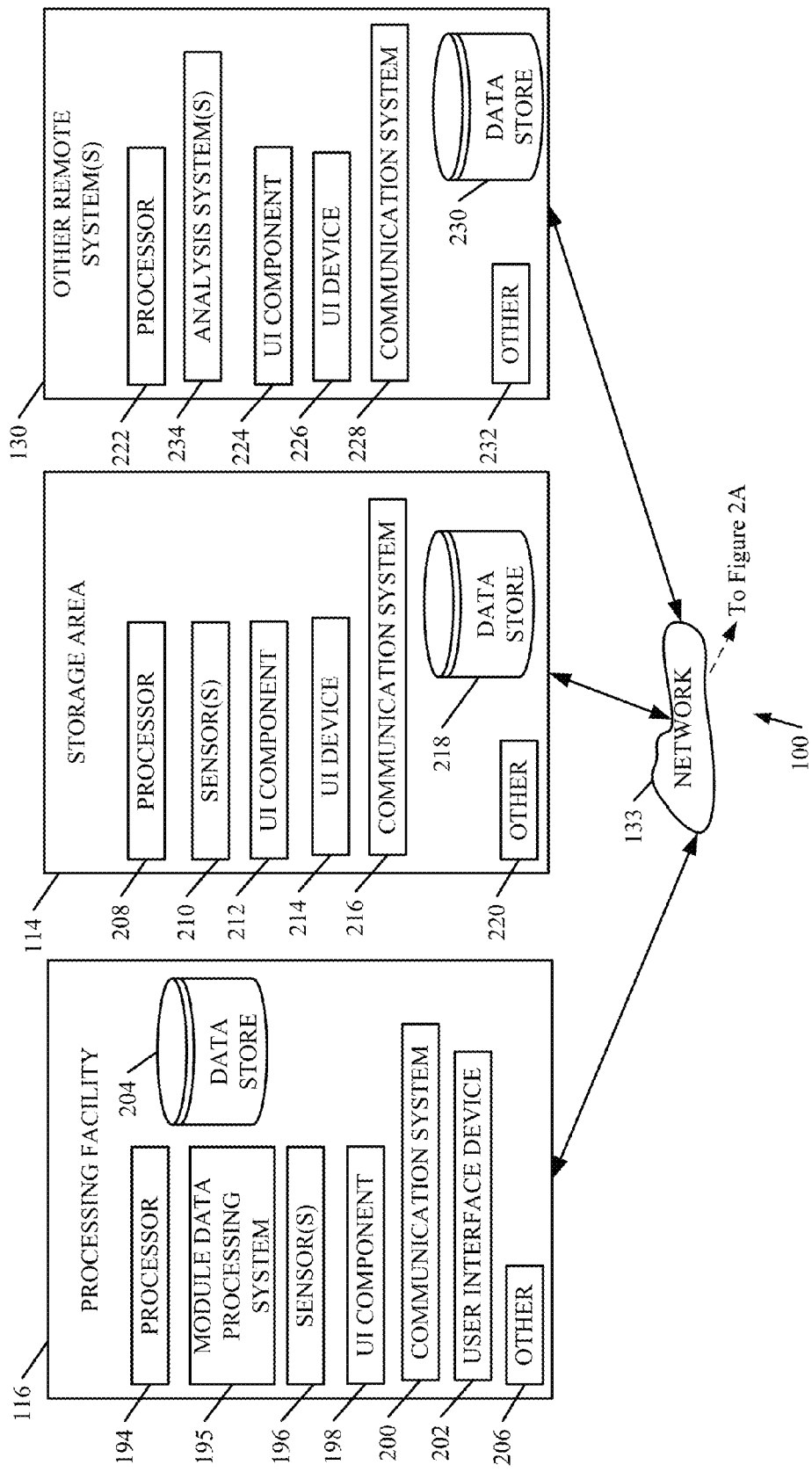

FIG. 2 shows a block diagram illustrating one example of the various items in module processing operation 100, in more detail. FIG. 2 thus shows portions of module forming machine 102, module staging machine 108, transport machine 112, storage area 114 and processing facility 116. In one example, some or all of these items can illustratively access the module records for modules 104, and use the information therein to perform their respective operations.

The example shown in FIG. 2 shows that other remote systems 130 can also access the module records. For instance, remote systems 130 may include a farm manager's computer system, a seed company system, a machine manufacturer system, an agronomist's system, or a wide variety of other systems that can access and analyze the information in the module record.

The example shown in FIG. 2 shows a module record data store 132 that can be accessed by the various items in operation 100 over a network 133. This is only one example of how the information in the module records can be accessed, and others are discussed below.

Before describing how operation 100 operates, in more detail, one example of each of the items in operation 100 will first be described with respect to FIG. 2.

Module forming machine 102 illustratively includes module forming functionality 134, module record generator 136, and one or more agricultural or other sensors 138. It can also include data store 140, location system 142, processor 144, user interface component 146, user interface device 148, communication system 150, and it can include other items 152 as well. The module forming functionality 134 illustratively includes all of the functionality (such as mechanical, hydraulic, pneumatic, electrical, etc.) that is used by machine 102 in order to form a module 104. Module record generator 136 illustratively generates a module record for each module 104, as it is formed and dropped by machine 102 in field 106. One example of information contained in the module records is discussed below with respect to FIG. 3A Sensors 138 can include a wide variety of different types of sensors. For instance, they can include one or more moisture sensors that sense the moisture content of modules 104, as they are being formed. They can include various weather sensors, yield sensors, quality sensors, machine sensors, fuel consumption sensors, and a wide variety of other sensors.

Data store 140 illustratively stores data on machine 102. It can be used, for example, to store the sensor data and other data.

Location system 144 illustratively senses a location of machine 102. By way of example, location system 142 can be a GPS system, a cellular triangulation system, a dead reckoning system, or a wide variety of other systems that allow machine 102 to identify a location where each module 104 is dropped in field 106.

User interface component 146 illustratively (either by itself or under control of other items in machine 102) generates user interfaces on user interface device 148 for an operator of machine 102. User interface device 148 can be a display device that generates user interface displays, an audible device that generates audible user interfaces, a haptic device that generates haptic user interfaces, or a wide variety of other types of user interface devices.

Processor 144 is illustratively a computer processor with associated memory and timing circuitry (not separately shown). It is illustratively a functional part of machine 102 and is activated by various other items in machine 102 to facilitate their operation.

Communication system 150 illustratively allows machine 102 to communicate with other items in operation 100. For instance, communication system 150 may be a cellular communication system, a communication system that allows machine 102 to access a wide area network (such as the Internet), a local area network communication system, a near field communication system, and/or a wide variety of other wired and wireless communication systems. In one example, communication system 150 can be used by machine 102 to store the module records on data store 130.

One example of the operation of module forming machine 102 is described in greater detail below with respect to FIG. 3. Briefly, however, module forming machine 102 illustratively generates module records 154-156 for the various modules 104 that it forms. One example of a module record is described in greater detail below with respect to FIG. 3A. Suffice it to say, for now, that module records 154-156 can include an identifier for each module 104, along with the location of each module 104 in field 106, and a variety of other characteristics of that module. For instance, the characteristics can be those sensed by sensors 138 or other characteristic sensors. Module record generator 136 can store the module records 154-156 either locally on data store 140, or they can be communicated to remote module record data store 132. Regardless of where they are stored, they are illustratively, at some point, made available to one or more of the other machines and systems in operation 100.

Before proceeding with the present description, it will be appreciated that the module records 154-156 can be made available for access to various machines and systems in operation 100 in a variety of different ways. For instance, they can be stored in a remote data store 132 that is accessible by all of the machines and systems. The machines and systems can access the remote data store 132 using any of a wide variety of different networks, represented in FIG. 2, by network 133. Network 133, for instance, can be one or more of a cellular network, a large area network such as the Internet, a local area network, or other networks. In addition, the machines and systems can access the module records 156 by having them transmitted directly from one machine or system to another, and having them stored locally on the data stores of each machine or system. Further, they can be transmitted using store and forward techniques where a machine that has no access to the cellular or other network or the Internet stores the module records locally. Then, when it comes into range of a given communication network, it transmits the module records to other machines or systems within the service area of that network. In another example, it can transmit the module records to remote data store 132 where they are later accessed by the other machines and systems. Further, they can be made available to the various machines and systems by storing them first on forming machine 102 and then by manually transmitting them. As an example, they can be manually transmitted using a removable storage device, such as a flash drive, a removable disk, or a variety of other removable storage mechanisms. They can be manually transmitted to another machine or system where they are locally stored. All of these and other types of mechanisms and architectures for making the module records 154-156 available to the various machines and systems in operation 100 are contemplated herein.

Module staging machine 108 illustratively includes module engagement functionality 158, location system 160, data store 162, processor 164, communication system 166, and staging tool 168. It can include, user interface component 170, user interface device 172, one or more sensors 174, and it can include other items 176 as well. Module engagement functionality 158 includes the functionality (such as electrical, mechanical, pneumatic, hydraulic, etc.) of machine 108 so that machine 108 can be operated by an operator in order to engage and move modules 104 to a staging area.

Location system 160, like location system 142 in machine 102, illustratively provides a location of machine 108. Therefore, after machine 108 moves a module 110 to a staging area, it can illustratively modify the module record corresponding to that module to include its new location.

Processor 164 and data store 162 can be similar to processor 144 and data store 140 described above.

The module record for the modules 104 that are being staged by staging machine 108 can be downloaded and stored in data store 162, or they can be accessed from remote data store 132 over network 133. Thus, communication system 166 (as with communication system 150 in machine 102) can be a wide variety of different types of communication systems that allow machine 108 to access remotely stored module records. In another embodiment, communication system 166 allows machine 108 to communicate directly with machine 102 to receive the module records from local data store 140 on machine 102, so that they can be stored locally on data store 162 of machine 108.

Sensors 174 can sense a variety of different characteristics (such as weather, machine parameters, fuel consumption, and a wide variety of other things) with respect to machine 108. User interface component 170 (either by itself, or under the direction of other items in machine 108) illustratively generates user interfaces on user interface device 172 for the operator of machine 108. The user interfaces can include interface displays, audible or haptic user interfaces, or a wide variety of other user interfaces.

The operation of machine 108 is described in greater detail below with respect to FIG. 4. Briefly, however, staging tool 168 can access the module records 154-156 for the various modules 104 in field 106. It illustratively generates a user interface for the operator of machine 108, providing some indication of which modules 104 should be staged together. As but one example, staging tool 168 can generate a user interface display identifying the location of various modules 104 that have a similar moisture content. This can be done by generating a separate user interface display from those already generated, or by augmenting already existing user interface displays or in other ways. Some examples can include displaying a view of the field with groups of modules 104 visually distinguished from one another based on moisture content, etc. Thus, the operator of machine 108 can identify those modules with the highest moisture content (e.g., the ones that should be processed sooner) and group them together. The operator can also illustratively arrange the groups 110 based upon priority so that modules that should be processed more quickly can be transported to the processing facilities more quickly. This is discussed in greater detail below as well. Machine 108 then updates the module records of the staged modules with their staged location, and it can add other information as well.

Transport machine 112 illustratively includes location system 178, processor 180, user interface component 182 and user interface device 184. It can also include data store 186, one or more sensors 188, communication system 190 and it can include other items 192 as well. Location system 178, like the other location systems 142 and 160, illustratively provide a location of transport machine 112. Processor 180 and data store 186 can be similar to those described with respect to machines 102 and 108. In addition, user interface component 182 and user interface device 184 can be similar to the others as well. Also, communication system 120 can be similar to the communication systems described above. Sensors 188 can sense various characteristics of the modules as they are transported by machine 112, and they can sense characteristics of machine 112 or other items as well.

One example of the operation of machine 112 is described below with respect to FIG. 5. Briefly, however, user interface component 182 illustratively accesses module records 154-156 for modules to be transported. It can control user interface device 184 to generate a user interface that indicates to the operator of transport machine 112 where a highest priority group 110 of modules 104 are located. Machine 112 can then go to that location of grouped modules and load them. The module records 154-156, corresponding to the loaded modules, also illustratively indicate a destination of where they are to be transported (such as to a storage facility 114, or a processing facility 116, or elsewhere). User interface component 182 thus also generates a user interface for the operator of machine 112 indicating where the modules are to be transported. When transport machine 112 unloads the modules at the desired destination, it also illustratively updates the module records 154-156 corresponding to those modules to at least indicate their new location. It can also augment the module records 154-156 with additional sensor information, operator information, or a wide variety of other information.

Processing facility 116 illustratively includes processor 194, module data processing system 195, sensors 196, user interface component 198, communication system 200 and user interface device 202. It can also include data store 204 and other items 206. One example of the operation of processing facility 116 is described in greater detail below with respect to FIG. 6. Briefly, however, system 195 illustratively accesses module records 154-156 for modules that have been transported to facility 116. It illustratively generates a user interface on user interface device 202 to personnel at facility 116, indicating the processing priority of the various modules that reside at facility 116. It can thus indicate which modules are to be processed sooner than other modules.

Further, the module records 154-156 corresponding to those modules may provide an indication as to the processing conditions for those specific modules. For instance, if a given module is very dry, then the processing conditions may be adjusted to add moisture. Of course, the processing conditions can be modified in other ways as well, based upon the information in the module records 154-156 corresponding to the modules being processed. It will be noted that, in one example, processor 194 automatically makes adjustments to the processing system based on the information in the module records 154-156. In another example, the user interface component 198 generates a user interface suggesting the modified processing conditions to operating personnel. In yet another example, some operating conditions are automatically modified based upon the information in the module records 154-156, while other operating conditions are suggested for manual adjustment.

FIG. 2 shows that, in one example, storage area 114 illustratively includes processor 208, sensors 210, user interface component 212, user interface device 214, and communication system 216. It can also include data store 218 and other items 220. These items can be similar to those described above with respect to the other machines and facilities. However, in one example, user interface component 212 accesses the module records 154-156 for the particular modules that are stored at storage area 114. It can thus generate a user interface for personnel at storage area 114 indicating how to process or otherwise treat those modules in storage area 114. For instance, it may identify the location of modules that have a relatively high moisture content. In that case, those modules can be dried prior to being placed in longer term storage. In addition, it can illustratively identify a storage life of each of the modules and indicate which modules should be shipped to processing facility 116 first, in order to maintain the quality of those modules. A wide variety of other user interfaces can be generated as well.

As briefly mentioned above, other remote systems 130 can include a wide variety of different systems. They can include, for instance, processor 222, user interface component 224, user interface device 226, communication system 228, data store 230 and other items 232. They can also include analysis systems 234. Thus, users at remote systems 130 can perform analysis based upon the information in module records 154-156. They can use the analysis results to interactively modify operation 100, to view the performance of the various operators in operation 100, to make decisions for a subsequent year, or to perform a wide variety of other tasks.

Figure 3:
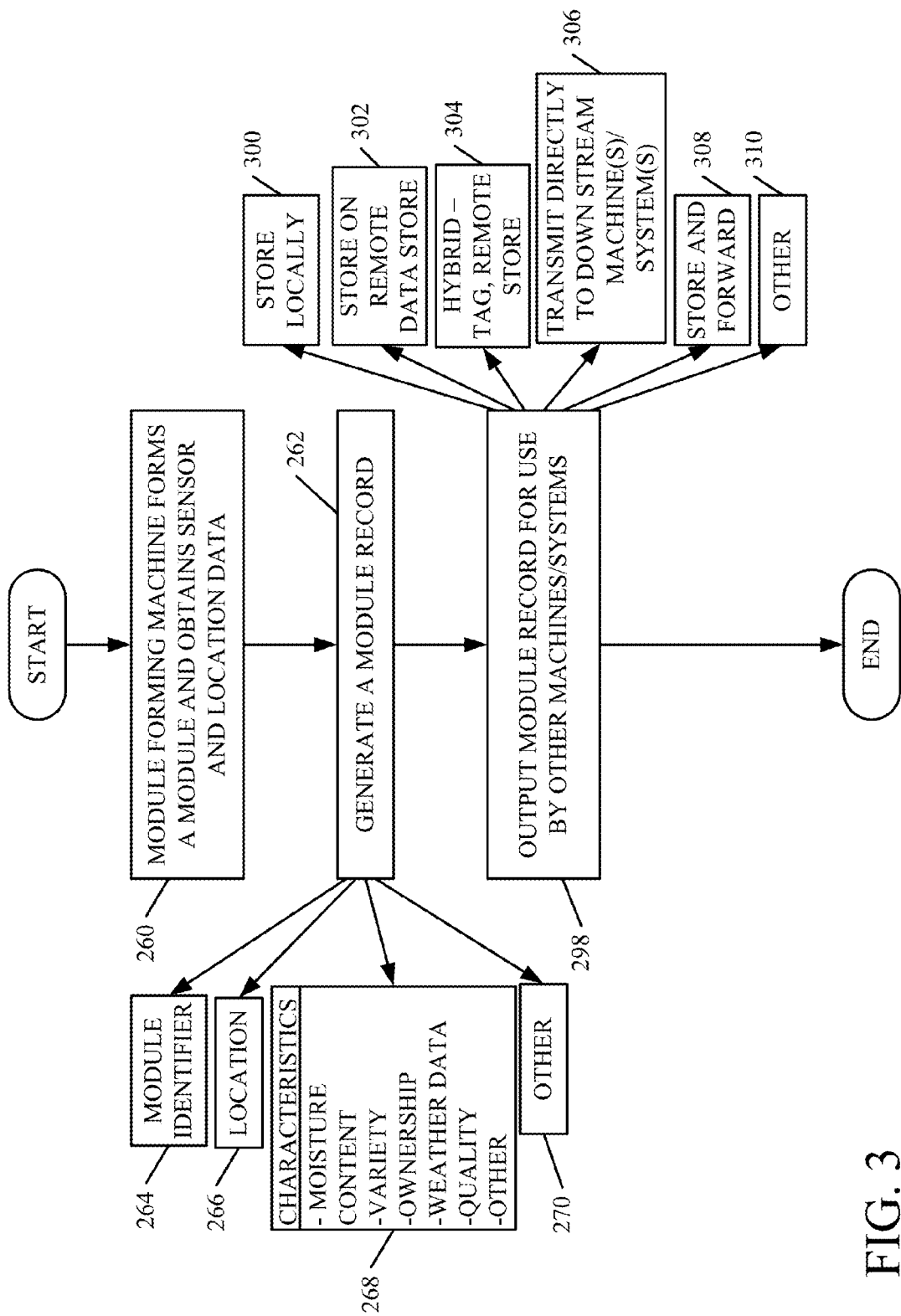
FIG. 3 is a flow diagram illustrating one example of the operation of a module forming machine.

FIG. 3 is a flow diagram illustrating one example of the operation of module forming machine 102 in more detail. The module forming functionality 134 of machine 102 first forms a module and obtains sensor data from sensors 138 and location data from location system 142. This is indicated by block 260 in FIG. 3.

Module record generator 136 then generates a module record corresponding to the module that has just been formed. This is indicated by block 262. It can include a wide variety of characteristics that are sensed or that otherwise correspond to the module that was just formed. This is indicated by block 268. It can include other items as well, as indicated by block 270.

FIG. 3A shows one example of a module record 272. In the example shown in FIG. 3A, the module record that is generated by module record generator 136 includes the module identifier 164 which uniquely identifies the module. It includes the location information 266 that identifies the location in field 106 where the module was dropped by machine 102. It can include operator and machine information 274 that identify the operator of machine 102, as well as the machine itself. It can include a wide variety of sensed characteristics and other characteristics 268.

The characteristics can include the moisture content 276 generated by a moisture sensor mounted on machine 102. It can include a crop variety characteristic 278 indicative of the variety of the crop that is being harvested. It can include ownership information 280. For instance, some operations 100 harvest crops for a plurality of different owners. Thus, the ownership information 280 identifies the ownership of the particular module that was just created. The characteristics 268 can include weather data 282 that can be obtained from a remote weather sensing system, or that can be obtained from sensors on machine 102. Characteristics 268 can include quality data 284, such as a color indicator indicating a color of the harvested material, or a wide variety of other quality data. For instance, where the module is a cotton bale, other quality data can include seed weight, lint weight, grade, etc. Characteristics 268 can include yield data 286, overall size data 288 that indicates the overall size of the module, weight data 290 that indicates the weight of the module, and it can include inferred or derived characteristics 292. For instance, given the weight and size of the module, the module's mass can be calculated. A wide variety of inferred or derived characteristics 292 can be obtained as well. Further, the characteristics 268 can include any other desired characteristics that are sensed, manually input, or otherwise obtained by module record generator 136. These other characteristics are identified by block 294. FIG. 3A shows that the module record 274 can include other module record information, and this is indicated by block 296.

Referring again to the flow diagram of FIG. 3, once module record generator 136 has generated the module record for the module that was just created and dropped, it outputs the module record for use by other machines or systems. This is indicated by block 298 in FIG. 3. For instance, the module record can be stored locally on data store 140 for later transmission. This is indicated by block 300. Communication system 150 can be used to communicate it for storage on remote data store 132. This is indicated by block 302. It can be stored in a hybrid format where some or all of the information is stored on a storage device (such as in RFID tag) that is appended to the module itself, and some or all of the information is also stored on remote data store 132 or on local data store 140 or in another place. This is indicated by block 304. It can be made available to other machines or systems by transmitting it directly to those machines and systems using wired or wireless transmission techniques. This is indicated by block 306. It can be made available using store and forward techniques. This is indicated by block 308. It can be made available to the other machines and systems in operation 100 in other ways as well, and this is indicated by block 310.

Figure 4:
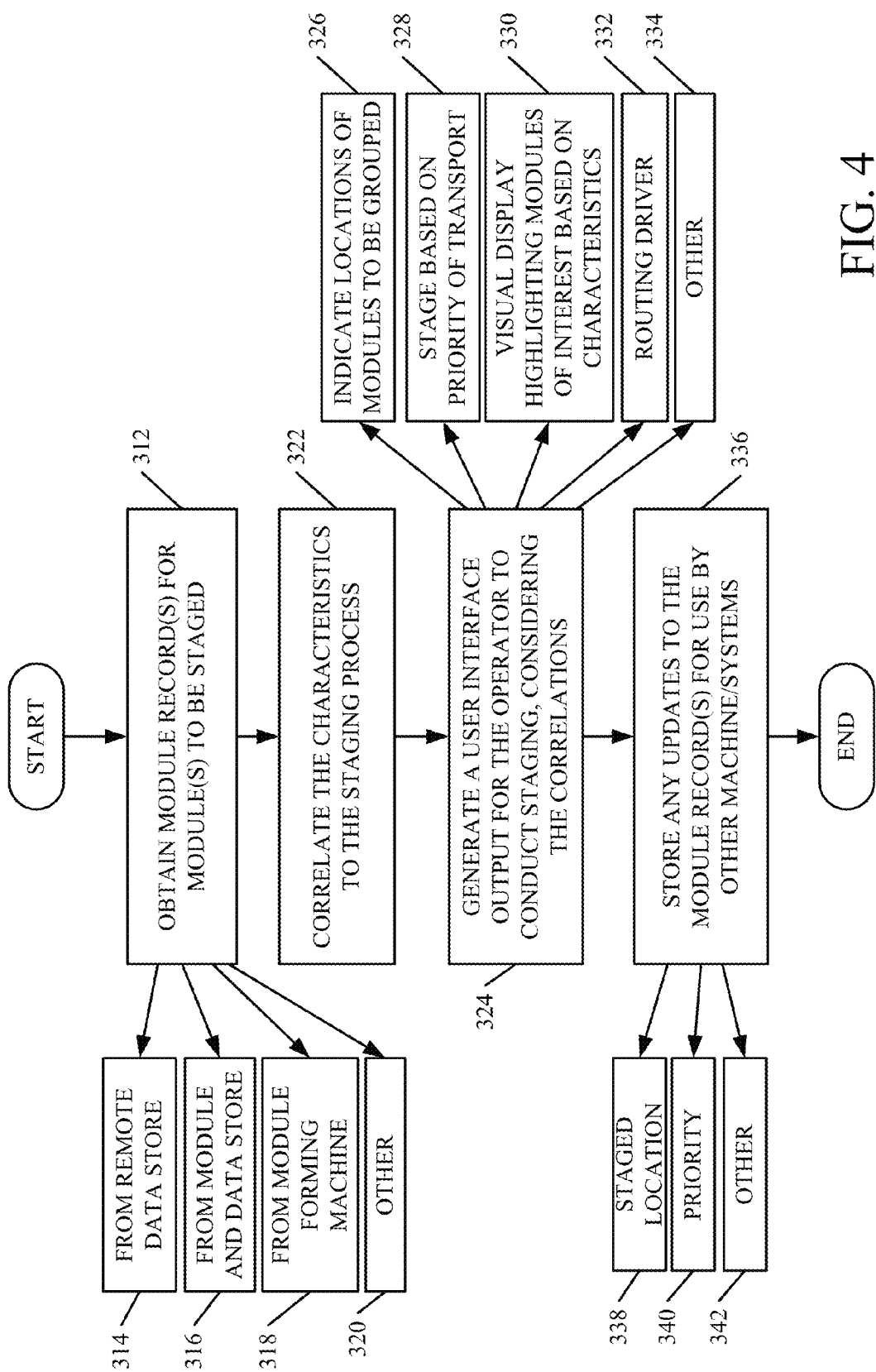
FIG. 4 is a flow diagram illustrating one example of the operation of a staging machine.

FIG. 4 is a flow diagram illustrating one example of the operation of module staging machine 108, in using the information in the module records 154-156. In one example, staging tool 168 first obtains the module records for the modules that are to be staged in field 106. This is indicated by block 312 in FIG. 3. Staging tool 168 can obtain the module records for the modules in field 106, as the modules are dropped by machine 102 and as the module records are created. Tool 168 can also obtain the module records for a plurality of different modules, intermittently, instead of continuously. It can obtain the module records from remote data store 132, as indicated by block 314. It can obtain the information both from the tags on the modules, themselves, and from remote data store 132. This is indicated by block 316. The information can be obtained directly from module forming machine 102, using a local area network, or another wired or wireless communication system. This is indicated by block 318. Staging tool 168 can obtain the information in the module records in other ways as well, and this is indicated by block 320.

Staging tool 168 then correlates the characteristics or other information in the module records to the staging process. This is indicated by block 322. For instance, staging tool 168 can correlate the characteristics in the module records to the staging process by identifying certain staging operations or steps that should be taken (or the order in which they should be taken, etc.) based upon the characteristics in the module records. Staging tool 168 can, for example, determine how the staging process performed by staging machine 108 should be conducted or modified based upon the information in the module records for the various modules 104 in field 106.

Staging tool 168 then generates a user interface output for the operator of machine 108 indicating how the operator is to conduct staging, based upon the correlations that it has derived at block 322. Generating the user interface output is indicated by block 324.

There are many different ways that the tool 168 can correlate the information in the module records to the staging process and indicate to the operator how the staging process should be conducted based on the correlation. Some examples will now be discussed. The user interface output can indicate the locations of modules 104 in field 106 that are to be grouped together. This is indicated by block 326. This can be done in a variety of different ways. For instance, staging tool 168 can use mapping information to direct the operator of machine 108 to a next set of modules that are to be grouped together in groups 110. It can also generate a visual display, such as a heads-up display, in which modules that are to be grouped together are visually identified. For instance, the heads-up display may show all modules that are to be grouped together in a visually distinguishing way, such as by highlighting them in red. Where the display is not a heads-up display but another type of display, it can also be used to identify the location of modules 104 that are to be grouped together. For instance, the display may be a map of the field, or another view of the field, showing the locations of the modules, and visually indicating which modules have similar moisture content. Those modules can be visually identified as well, such as visually highlighting them, having the groups color coded, blinking, etc.

Staging tool 168 can also generate a user interface output in other ways, highlighting modules of interest, based upon their characteristics. For instance, it can highlight all modules that have a relatively high moisture content. The user of machine 108 will then know that those modules should be grouped together, and staged in a relatively high priority staging area so they are picked up sooner. Staging tool 168 may generate the user interface output in a relatively fine granularity. For instance, it may identify those modules that have a moisture content in a similar range. As an example, it may break the moisture content of the modules into three or more different ranges. The first may be a relatively high moisture content range, the second may be a medium moisture content range, and the third may be a relatively low moisture content range. It can thus generate a user interface display identifying the range that the individual modules reside in, based upon the moisture content of those modules as sensed and recorded by machine 102. The operator of staging machine 108 can thus group modules that have a similar moisture content in the same groups. The operator can also place them in the appropriate staging area so that they are picked up by transport machine 112 according to the desired priority. Generating a visual display highlighting modules of interest, based upon their characteristics, is indicated by block 330.

Staging tool 168 can also be a mapping system to show a most efficient staging route for the operator of module 108 to follow in performing staging. This is indicated by block 332.

Tool 168 can also identify to the operator of machine 108 which modules 104 are to be staged based on a priority of transport. This is indicated by block 328. By way of example, it may be that transport machine 112 picks up groups 110 of modules 104 in a given order (such as North to South, East to West, etc.). In that case, staging tool 168 generates a user interface output to the operator of machine 108 indicating the priority of various modules. The operator of machine 108 can then stage those modules in the staging area, at a location where they are to be picked up according to the identified priority. Modules that are to be picked up more quickly can be grouped in a high priority staging area whereas those that are to be picked up later can be grouped in a lower priority staging area.

Tool 168 can generate a user interface output to guide the operator of machine 108 in performing the staging process based upon the characteristics and correlations in other ways as well. This is indicated by block 334.

As machine 108 is moving modules 104 into groups 110 in the staging location, it also illustratively stores any updates to the module records for use by the other machines or systems in operation 100. This is indicated by block 336. For instance, it can update those records to identify the staged location of the corresponding modules. This is indicated by block 338. It can update the records to assign a transport priority for the groups 110 or for the individual modules 104. This is indicated by block 340. It can update the module records for the staged modules in other ways as well, and this is indicated by block 342.

Figure 5:
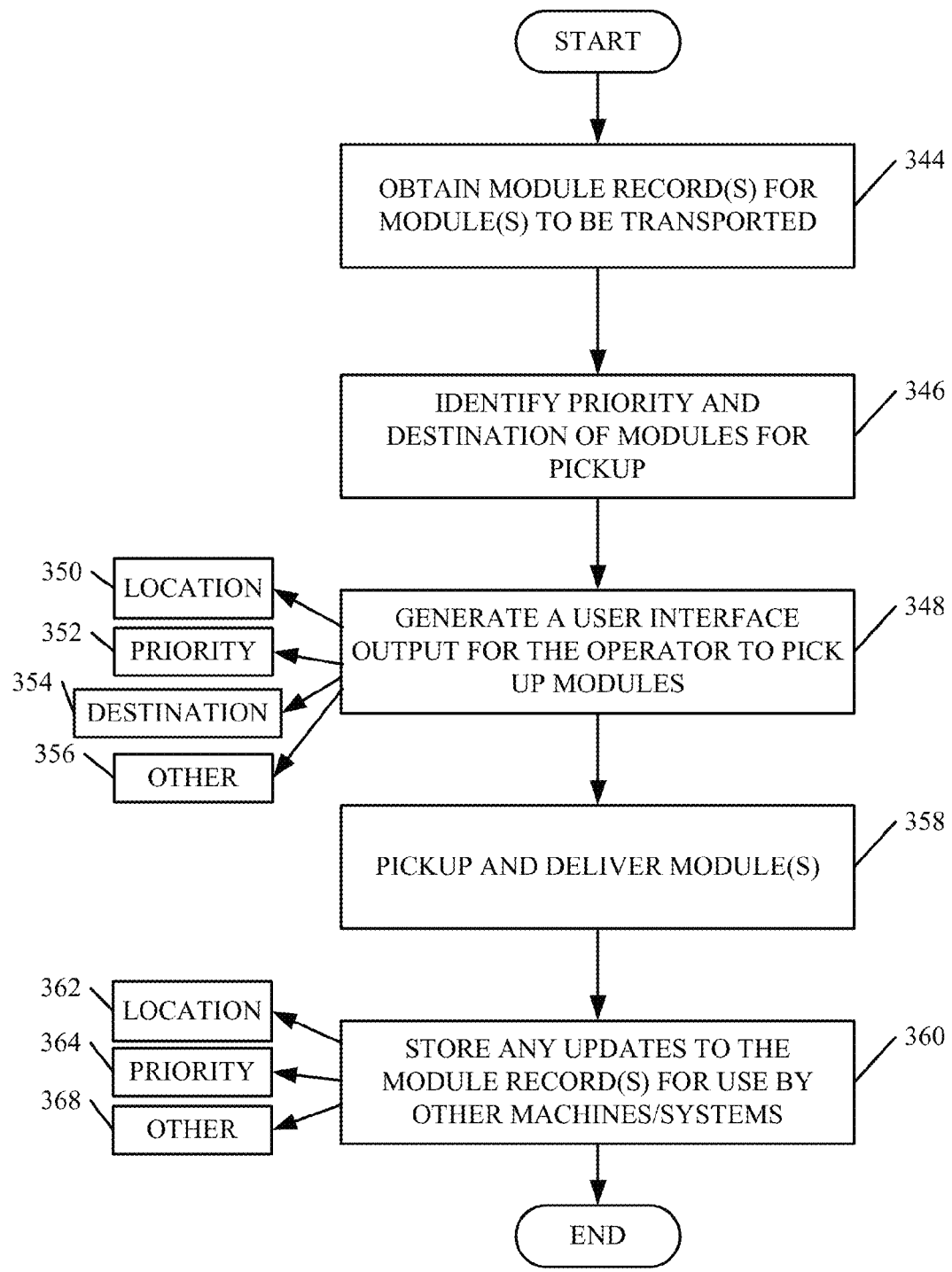
FIG. 5 is a flow diagram illustrating one example of the operation of a transport machine.

FIG. 5 is a flow diagram illustrating one example of how transport machine 112 can use the information in the module records 154-156. Transport machine 112, first obtains the module records for the modules that are being transported, or that are to be transported from field 106. This is indicated by block 344 in FIG. 5. Again, machine 112 can use communication system 190 to obtain them from remote data store 132. It can obtain them from staging machine 108 or from forming machine 102. It can obtain them either using a wired or wireless connection, it can obtain them manually by having the operator of machine 108 transfer a removable storage device to machine 112, or it can obtain them in other ways as well.

Processor 180 then illustratively identifies the priority and destination of modules that are to be picked up in field 106, based upon the information in the module record for those modules. This is indicated by block 346. By way of example, it may be that staging tool 168 identified relatively high moisture content modules and augmented the module records for those modules to indicate that they are high priority, and to indicate the location where they are staged. User interface component 182 then generates a user interface output for the operator of machine 112 identifying the location of the highest priority modules to be picked up. This is indicated by block 348. The user interface output can be a display, an audio output, a haptic output or another output. The output illustratively identifies the location 350 of the modules to be picked up, their priority 352, the destination 354 to which they are to be transported (such as the storage area 114, the processing facility 116, etc.). The user interface output can include other items as well, as indicated by block 356. Machine 112 then picks up and delivers the modules. This is indicated by block 358. As the modules are being delivered, machine 112 illustratively stores any updates to the module records for those modules, so that they can be used by other machines or systems in operation 100. This is indicated by block 360. For instance, it can update the module record to indicate the new location 362 of the modules, it can update it to indicate whether the priority for those modules has changed, as indicated by block 364, or it can update the module records in other ways as well, as indicated by block 366.

Figure 6:
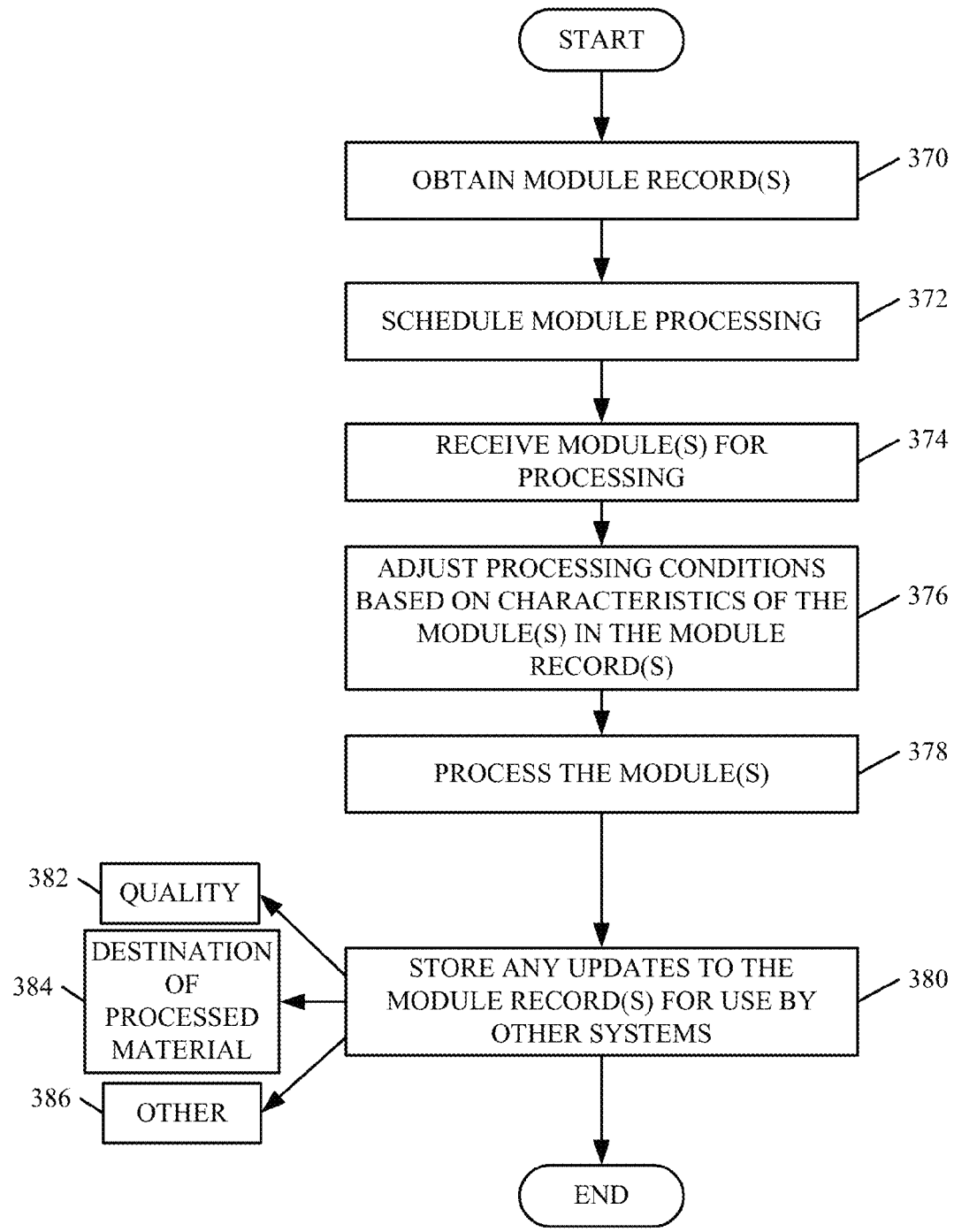
FIG. 6 is a flow diagram illustrating one example of the operation of a processing facility.

FIG. 6 is a flow diagram illustrating one example of the operation of processing facility 116, in using the module records for the modules that it processes. Module data processing system 195 first obtains the module records for the modules. This is indicated by block 370 in FIG. 6. It then schedules various modules for processing. This is indicated by block 372. For instance, it can schedule high priority modules to be processed sooner than low priority modules. Even where a priority has not been assigned, it can identify the moisture content of the modules to be processed and schedule their processing based on moisture content. It can schedule the module processing for modules owned by a given owner to occur all at once. It can schedule the processing for modules of a given variety to occur at once as well. By way of example, it may be that different crop varieties have different processing conditions. Thus, the processing conditions at facility 116 can be set for a given variety, and all of the modules of that variety can be processed at the same time. Of course, these are only examples of how module processing can be scheduled, and other examples can be used as well.

Facility 116 ultimately receives the scheduled modules for processing. They can be received from storage area 114, from field 106, or from other locations. Receiving the modules for processing is indicated by block 374.

Module data processing system 195 then illustratively adjusts the processing conditions at facility 116 based on the characteristics of the modules being processed. This is indicated by block 376. This can be done by providing an operator interface output to an operator to perform manual adjustments. It can also be done automatically based upon the characteristics of the modules being processed. By way of example, if a set of cotton modules has undesirably low moisture content, then moisture can be added during the processing operations. Other processing condition adjustments can be made as well, of course, and this is but one example.

Facility 116 then processes the modules. This is indicated by block 378. During or after processing (or both), processing system 195 can also store any updates to the module records for use by other systems. This is indicated by block 380. This can take a variety of different forms. For instance, where sensors 196 sense the quality of the modules being processed (or where this is observed by the operator), the module records can be updated to include additional quality data 382. The module records can be updated to indicate the destination to which the processed material was shipped after it left processing facility 116. This is indicated by block 384. It can include a wide variety of other information as well, and this is indicated by block 386.

It can thus be seen that the moisture or other characteristics of a crop being harvested and formed into modules can be utilized downstream in order to improve processing and quality control of the crop. It can allow the operator of staging machine 108 to stage modules using the moisture content or other sensed characteristics of the modules. Staging and other operations in the processing downstream of the harvester can be performed using the moisture content or other characteristics of the modules to increase the performance of the downstream processing.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
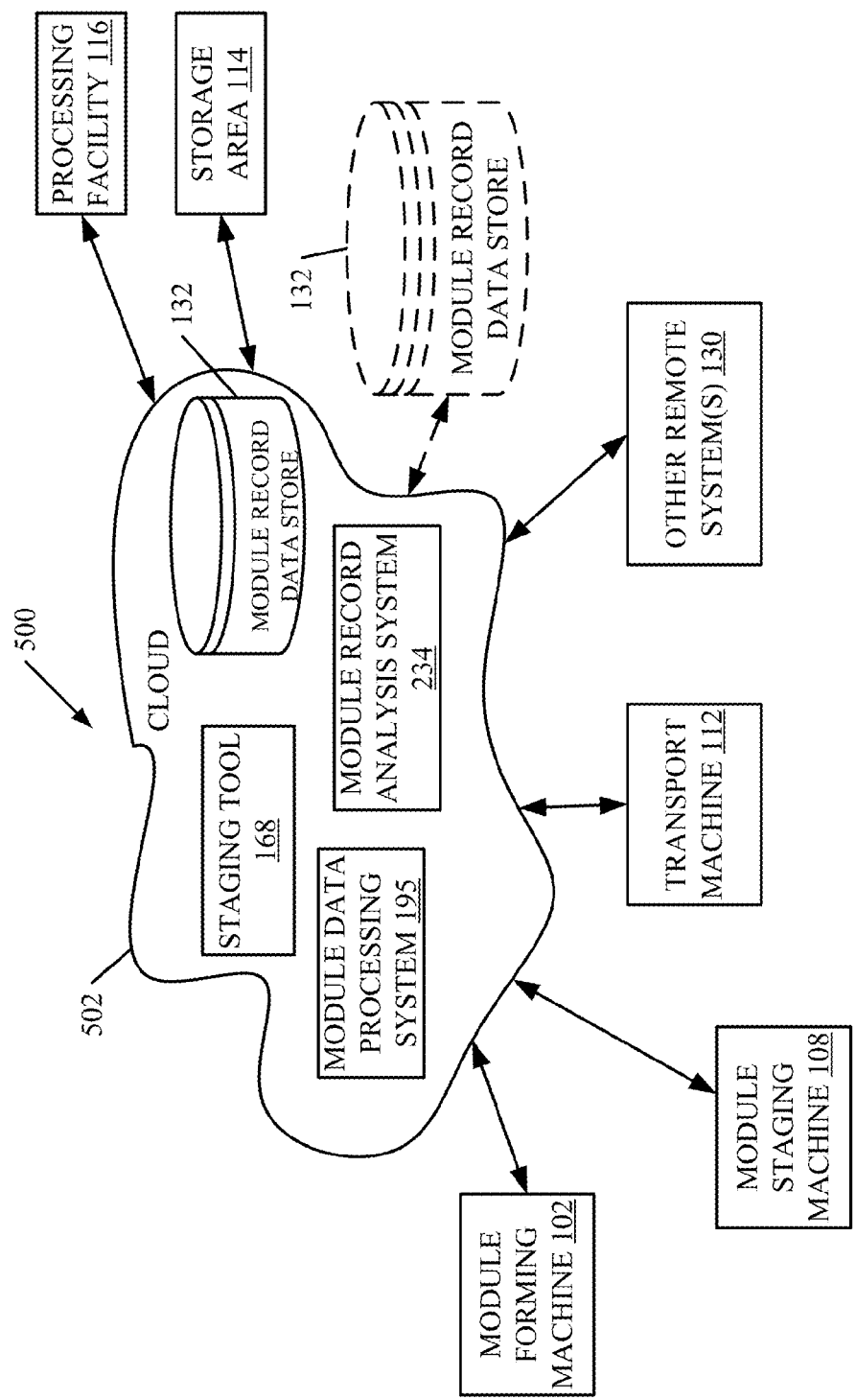
FIG. 7 is a block diagram of the operation shown in FIG. 1 using a remote server architecture.

FIG. 7 is a block diagram of operation 100, shown in FIGS. 1 and 2, except that it communicates with elements in a remote server architecture 500. In an example embodiment, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the embodiment shown in FIG. 7, some items are similar to those shown in FIG. 1 and they are similarly numbered. FIG. 7 specifically shows that remote data store 132, staging tool 168 module data processing system 195 and a module record analysis system 234 can be located at a remote server location 502. Therefore, operation 100 accesses those systems through remote server location 502.

FIG. 7 also depicts another embodiment of a remote server architecture. FIG. 7 shows that it is also contemplated that some elements of FIG. 2 are disposed at remote server location 502 while others are not. By way of example, remote data store 132 can be disposed at a location separate from location 502, and accessed through the remote server at location 502. Regardless of where they are located, they can be accessed directly by machines and systems in operation 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the module forming machine 102 comes close to the fuel truck for fueling, the system automatically collects the information from machine 102 using any type of ad-hoc wireless connection. The collected information can then be forwarded to the main network 133 as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine 102 or other machines or until the machine enters a covered location. The machine, itself, can then send the information to the main network.

It will also be noted that the elements of FIGS. 1 and 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
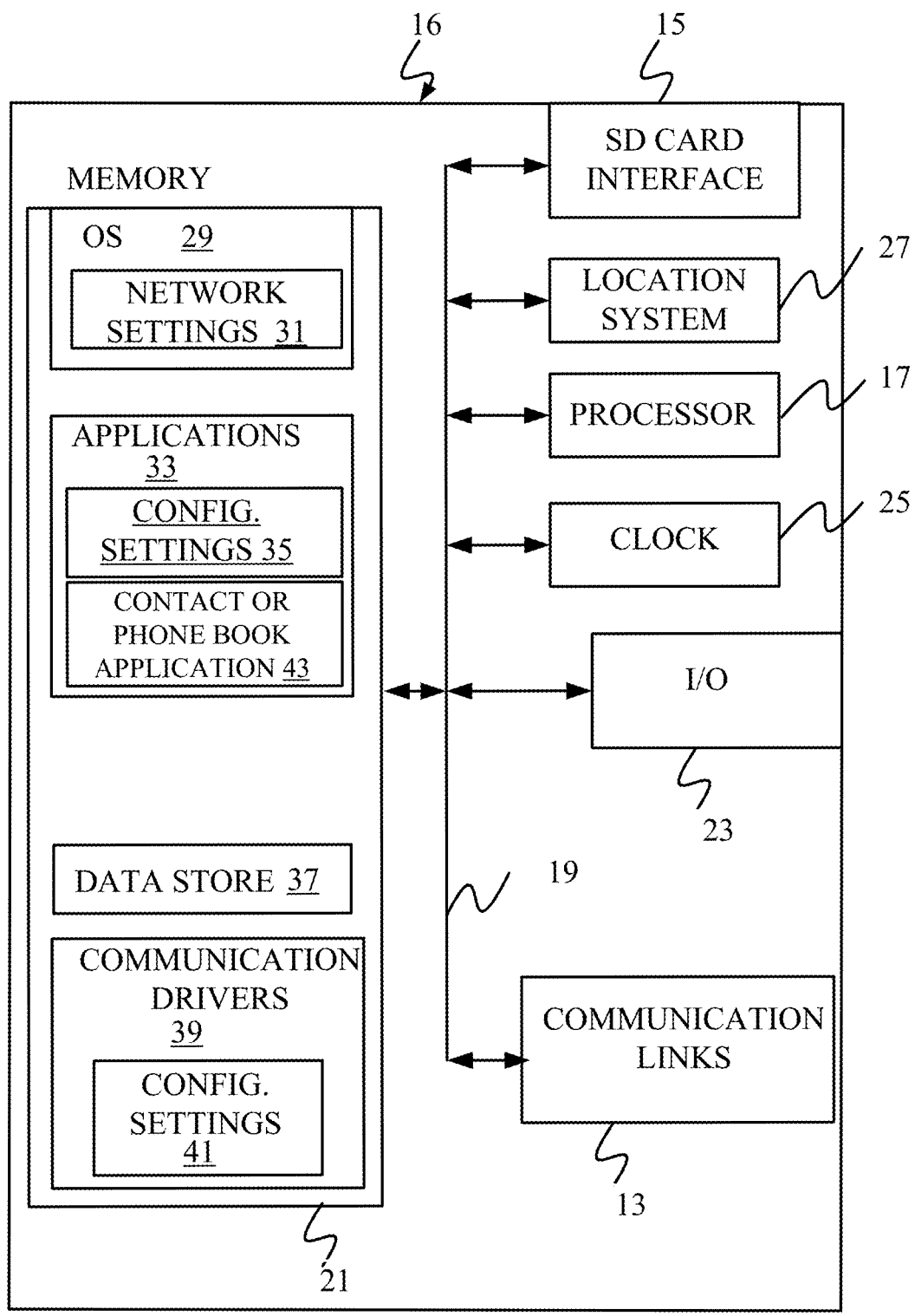
FIG. 8 is a block diagram of one example of a mobile computing device that can be used in the machines or systems shown in FIG. 1.
Figure 9:
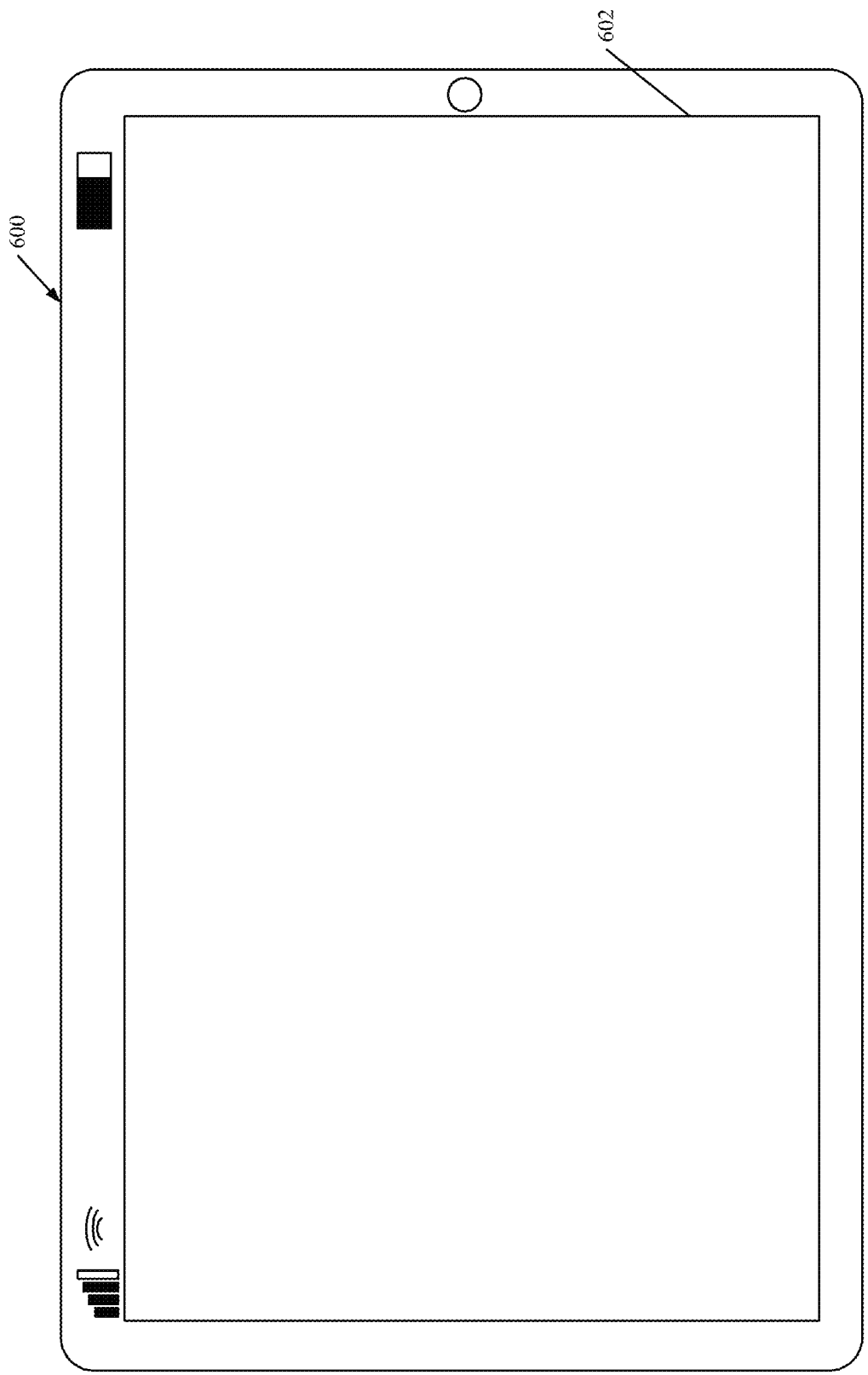
FIGS. 9 and 10 show various embodiments of mobile computing devices.
Figure 10:
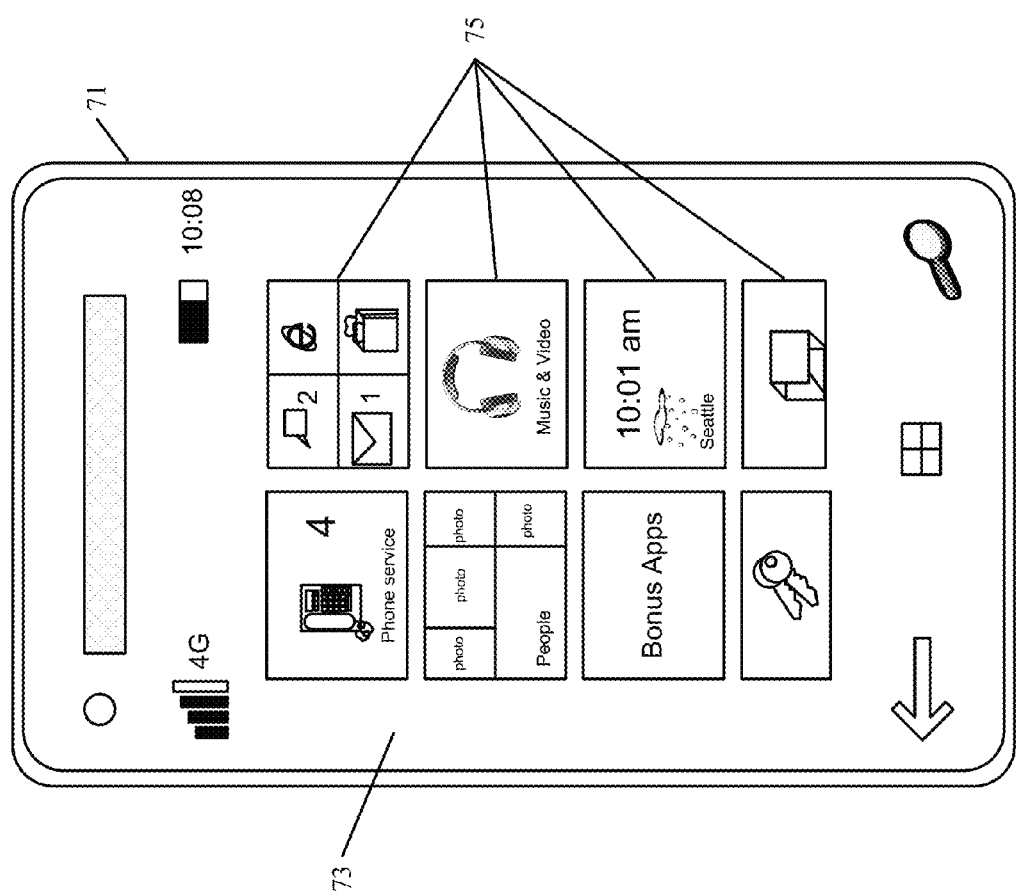

FIG. 8 is a simplified block diagram of one illustrative embodiment of a handheld or mobile computing device that can be used as a user's or client's hand held device 16, in which the present system (or parts of it) can be deployed. For instance, a mobile device can be deployed in the operator compartment of any of the machines or systems in operation 100. FIGS. 9-10 are examples of handheld or mobile devices.

FIG. 8 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

Under other embodiments, applications can be received on a removable Secure Digital (SD) card that is connected to an interface 15. Interface 15 and communication links 13 communicate with a processor 17 (which can also embody any or all of the processors from FIG. 2) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one embodiment in which device 16 is a tablet computer 600. In FIG. 9, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional example of devices 16 that can be used as well. Such examples can include smart phone or mobile phone. The phone can include a set of keypads for dialing phone numbers, a display capable of displaying images including application images, icons, web pages, photographs, and video, and control buttons for selecting items shown on the display. The phone can also include an antenna for receiving cellular phone signals. In some embodiments, the phone also includes a Secure Digital (SD) card slot that accepts a SD card.

FIG. 10 shows an example of a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
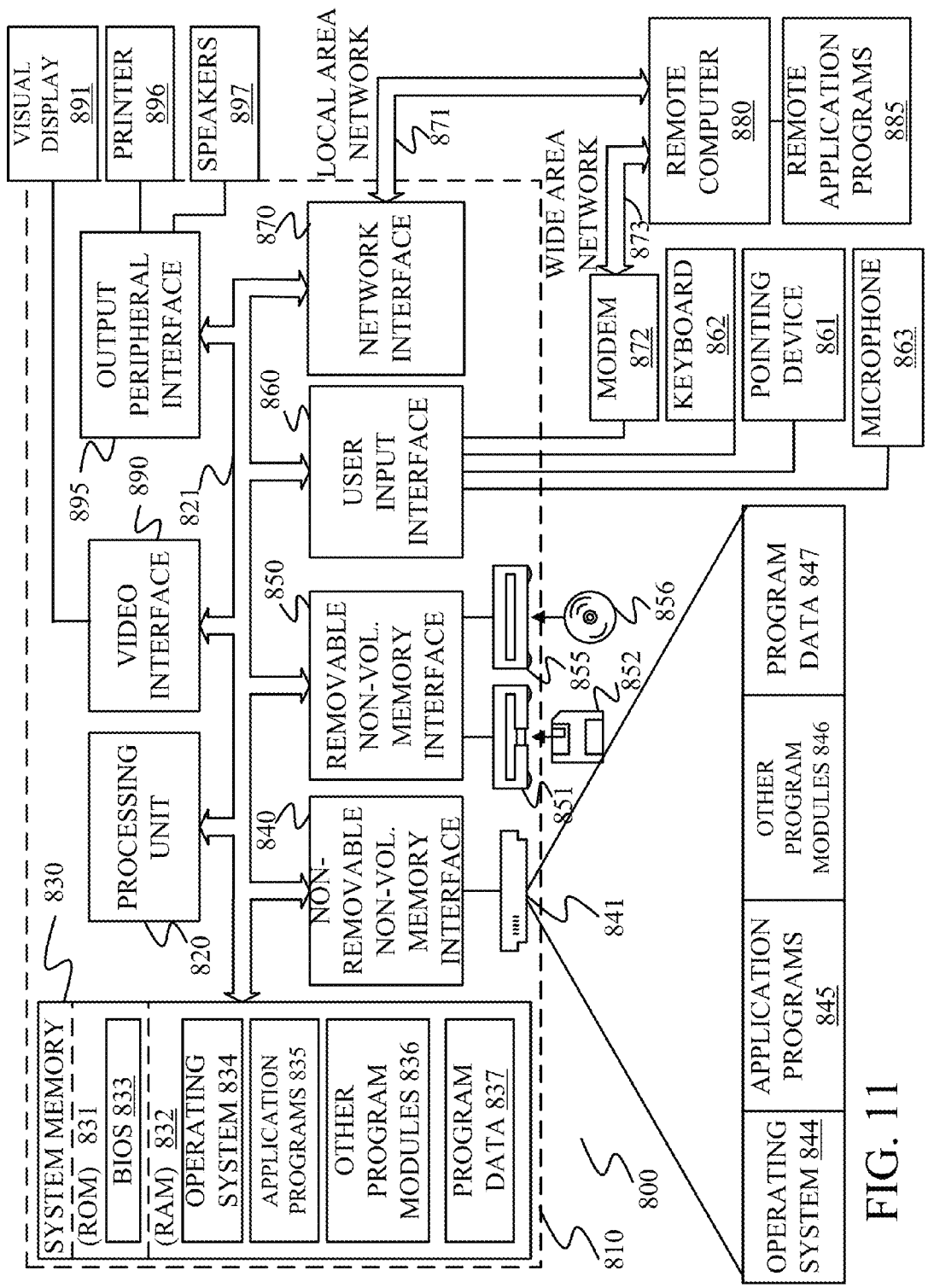
FIG. 11 shows one example of a block diagram of a computing environment that can also be used in the various machines and systems shown in FIG. 1.

FIG. 11 is one embodiment of a computing environment in which elements of FIGS. 1 and 2, or parts of them, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise any of the processors in FIG. 2), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 1 and 2 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 11 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, comprising:
   receiving module information corresponding to each of a plurality of modules of agricultural material, at a staging machine, the module information including a module identifier identifying the corresponding module, a sensed moisture content for the corresponding module and a location where the corresponding module is dropped by a module forming machine;
   identifying a priority for each of the plurality or modules, based on the received moisture content of the corresponding module;
   displaying a visual display that shows the field and locations in the field of the plurality of modules and visually identifies a subgroup within the plurality of modules based on the received moisture contents, wherein the subgroup comprises a subset of the plurality of modules having moisture contents in a predefined range;
   staging the plurality of modules in staged groups with the staging machine based on the identified priority and the identified subgroup.

2. The method of claim 1 and further comprising:
   forming the module with a module forming machine;
   sensing the moisture content of the module on the module forming machine; and
   dropping the module from the module forming machine at a location.

3. The method of claim 1 and further comprising:
   storing the module information for access by one or more machines or facilities in a module processing operation.

4. The method of claim 1 wherein staging the plurality of modules comprises:
   moving the modules to a staging location and grouping the modules into the staged groups according to the identified priority; and
   updating the module records for the plurality of modules to indicate a location of each of the plurality of modules in the staging location.

5. The method of claim 1 and further comprising:
   providing routing information to an operator of the staging machine indicative of a route to take in staging the plurality of modules.

6. An agricultural module processing system, comprising:
   a module forming machine having a moisture sensor that senses a moisture of each of a plurality of modules formed by the module forming machine and a location system that indicates a location where each module is dropped by the module forming machine in a field; and
   a module record generator that receives the sensed moisture content and location of each module and generates a module record corresponding to each module, the module record indicating a module priority based on the sensed moisture content and location of each corresponding module, the module record generator sending the module record to a second machine that receives the module records, wherein the second machine comprises a staging tool that displays a visual display that shows the field and locations in the field of the plurality of modules, and visually identifies a subgroup within the plurality of modules based on the sensed moisture content, wherein the subgroup comprises a subset of the plurality of different modules having sensed moisture contents in a predefined range, wherein the second machine is configured to arrange the modules in staged groups based on the module priority in the corresponding module records and the identified subgroup.

7. The agricultural module processing system of claim 6 wherein the module record generator further comprises:
   a communication system that communicates the module records corresponding to the modules to the second machine.

8. The agricultural module processing system of claim 6 wherein the second machine comprises:
   a transport machine that identifies a transport priority for the modules based on the corresponding module records and that transports the modules to a processing facility or storage area based on the transport priority.

9. The agricultural module processing system of claim 6 wherein the second machine comprises:
 a processing machine at a module processing facility, the processing machine processing the modules in an order based on the corresponding module records.

10. The agricultural module processing system of claim 6 wherein the second machine comprises:
 a processing machine at a module processing facility, the processing machine processing the modules using processing steps configured based on the corresponding module records.

11. The agricultural module processing system of claim 6 and further comprising:
 a remote data store that stores the module records for access by the second machine over a network.

12. An agricultural module staging system, comprising:
 a staging tool that receives a module record corresponding to each of a plurality of different agricultural modules that are located at different locations in a field, each module record having a module identifier identifying, for each of the plurality of different agricultural modules, a corresponding module, a location identifier identifying a location of the module, and a moisture content identifier indicative of a moisture content of the module; and
 an interface component coupled to the staging tool that is accessible to provide an output signal indicative of the module record, the interface component being configured to display a visual display that shows the field and locations in the field of the plurality of different modules, and visually identifies a subgroup within the plurality of different modules based on moisture content identifiers, wherein the subgroup comprises a subset of the plurality of different modules having moisture contents in a predefined range,
 wherein staging tool stages the plurality of different agricultural modules by arranging them in staged groups based on the identified subgroups.

13. The agricultural module staging system of claim 12 wherein the staging tool provides the staging output for sorting the modules based on moisture content.

14. The agricultural module staging system of claim 13 and further comprising: a staging machine with a display device, the display device generating a visual display, based on the staging output signal showing the location of the modules in the field and visually identifying the groups of modules based on the corresponding moisture content.

* * * * *